United States Patent
Amaral

(10) Patent No.: US 7,104,062 B2
(45) Date of Patent: Sep. 12, 2006

(54) DEVICE FOR THERMALLY CONTROLLING THE INTAKE AIR OF THE INTERNAL COMBUSTION ENGINE OF A MOTOR VEHICLE

(75) Inventor: Manuel Amaral, Paris (FR)

(73) Assignee: Peugeot Citroen Automobiles, S.A., Velizy-Villacoublay (FR)

( * ) Notice: Subject to any disclaimer, the term of this patent is extended or adjusted under 35 U.S.C. 154(b) by 0 days.

(21) Appl. No.: 10/489,442

(22) PCT Filed: Sep. 6, 2002

(86) PCT No.: PCT/FR02/03043

§ 371 (c)(1),
(2), (4) Date: Sep. 7, 2004

(87) PCT Pub. No.: WO03/023216

PCT Pub. Date: Mar. 20, 2003

(65) Prior Publication Data

US 2005/0235643 A1    Oct. 27, 2005

(30) Foreign Application Priority Data

Sep. 7, 2001  (FR) .................... 01 11609

(51) Int. Cl.
  *F02B 29/04*  (2006.01)
  *F02B 37/18*  (2006.01)
  *F01N 3/02*   (2006.01)
  *F01P 3/20*   (2006.01)
  *B60H 1/00*   (2006.01)

(52) U.S. Cl. .................... 60/599; 123/41.1; 123/563

(58) Field of Classification Search .............. 60/599; 123/563, 41.1, 41.21, 41.31, 559.1; 62/335
See application file for complete search history.

(56) References Cited

U.S. PATENT DOCUMENTS

| 3,355,877 A | 12/1967 | Chaffiotte ............ 60/599 |
| 3,450,109 A | 6/1969  | Gratzmuller .......... 60/599 |
| 4,096,697 A | 6/1978  | Treuil |
| 4,236,492 A | 12/1980 | Tholen .............. 60/599 |
| 4,317,439 A | 3/1982  | Emmerling ........... 123/563 |
| 4,474,162 A | 10/1984 | Mason ............... 123/563 |

(Continued)

FOREIGN PATENT DOCUMENTS

DE            4222087 A1 *  1/1994

(Continued)

OTHER PUBLICATIONS

Sekar, "A Primer on Charge Air Cooling," Automotive Engineering, vol. 90, No. 5, May 1, 1982, pp. 28-35.

*Primary Examiner*—Thai-Ba Trieu
(74) *Attorney, Agent, or Firm*—James R. Williams

(57) ABSTRACT

The device comprises a first heat exchanger (22) for exchanging heat between the admission air and a heat-transfer liquid for regulating the temperature of the admission air, the heat exchanger being connected to a circuit (24) for cold heat-transfer liquid, the device further comprising a second heat exchanger (26) for exchanging heat between the admission air and a heat-transfer fluid likewise for regulating the temperature of the admission air and connected to a circuit (28) for very cold heat-transfer fluid that is colder than the heat transfer liquid of the cold heat-transfer liquid circuit (24). The cold heat-transfer liquid circuit (24) preferably comprises a heat exchanger (30) for exchanging heat between air and the cold heat-transfer liquid, e.g. carried by a front face (31) of the motor vehicle.

18 Claims, 2 Drawing Sheets

U.S. PATENT DOCUMENTS

| | | | | |
|---|---|---|---|---|
| 4,520,767 | A | * | 6/1985 | Roettgen et al. ............ 123/41.1 |
| 4,615,172 | A | * | 10/1986 | Mayer ...................... 123/559.1 |
| 5,394,854 | A | | 3/1995 | Edmaier ...................... 123/563 |
| 5,758,718 | A | | 6/1998 | deLazzer ...................... 165/81 |
| 5,797,265 | A | | 8/1998 | Hagglund .................... 60/599 |
| 6,494,054 | B1 | * | 12/2002 | Wong et al. .................. 62/335 |
| 6,883,314 | B1 | * | 4/2005 | Callas et al. .................. 60/599 |
| 2002/0011242 | A1 | | 1/2002 | Ruppel ....................... 123/563 |

FOREIGN PATENT DOCUMENTS

| | | | |
|---|---|---|---|
| DE | 29723421 | | 10/1998 |
| DE | 19854544 | | 6/2000 |
| DE | 10239877 | A1 * | 3/2004 |
| EP | 0081716 | | 6/1983 |
| EP | 0249718 | | 12/1987 |
| FR | 2443573 | | 7/1980 |
| GB | 950020 | | 2/1964 |
| GB | 1153655 | | 5/1969 |
| GB | 2001128 | A * | 1/1979 |
| GB | 2023797 | A * | 1/1980 |
| GB | 2055963 | | 3/1981 |
| JP | 05272837 | A * | 10/1993 |

* cited by examiner

DEVICE FOR THERMALLY CONTROLLING THE INTAKE AIR OF THE INTERNAL COMBUSTION ENGINE OF A MOTOR VEHICLE

FIELD OF THE INVENTION

The present invention relates to an improved device for regulating the temperature of air admitted to the internal combustion engine of a motor vehicle.

BACKGROUND OF THE INVENTION

The invention applies in particular to regulating the temperature of the air admitted to a supercharged engine connected, where appropriate, to an exhaust system fitted with a particle filter.

It is desirable to cool the air admitted to an engine, in particular when the engine is supercharged by means of a turbocompressor unit provided firstly with a turbine located downstream from the engine and driven by the exhaust gas from the engine, and secondly with an admission air compressor arranged upstream from the engine. Because it is heated in the compressor, the air admitted to the engine must be cooled on leaving the compressor in order to optimize the performance of the engine and minimize polluting emissions.

In order to cool the air admitted to an engine, in particular at the outlet from the compressor of a turbocompressor unit, it is already known in the state of the art to provide a device for regulating the temperature of the air admitted to the internal combustion engine of a motor vehicle, the device being of the type comprising a first heat exchanger for exchanging heat between the admission air and a heat-transfer liquid, serving to regulate the temperature of the admission air and connected to a circuit for cold heat-transfer liquid.

Such a temperature regulator device is described in particular in U.S. Pat. No. 4,096,697.

SUMMARY OF THE INVENTION

A particular object of the invention is to optimize the cooling of air admitted to an engine, in particular at the outlet from the compressor of a turbocompressor unit.

To this end, the invention provides a device for regulating the temperature of air admitted to a motor vehicle internal combustion engine, the device being of the above-specified type and being characterized in that it comprises a second heat exchanger for exchanging heat between the admission air and a heat-transfer fluid, likewise serving to regulate the temperature of the admission air, and connected to a circuit for very cold heat-transfer fluid that is colder than the heat transfer liquid of the cold heat-transfer liquid circuit.

In accordance with characteristics of various embodiments of the device:

the cold heat-transfer liquid circuit comprises a heat exchanger for exchanging heat between air and the cold heat-transfer liquid, called low temperature heat exchanger, and preferably carried on a front face of the motor vehicle;

the heat-transfer liquid is put into circulation in the cold heat-transfer liquid circuit by a pump;

the heat-transfer fluid circulating both in the second heat exchanger for exchanging heat between the admission air and the heat-transfer fluid and in the very cold heat-transfer fluid circuit is a liquid;

the heat-transfer fluid circulating both in the second heat exchanger for exchanging heat between the admission air and the heat-transfer fluid and the very cold heat-transfer fluid circuit is a fluid, such as carbon dioxide $CO_2$ or Freon, for being circulated by a heat pump;

the device comprises a heat pump, the very cold heat-transfer liquid circuit being thermally coupled with a cold source of the heat pump;

the first heat exchanger for exchanging heat between the admission air and the heat-transfer liquid and the second heat exchanger for exchanging heat between the admission air and the heat-transfer fluid are arranged in the same module;

the engine delivers exhaust gas which is recycled in part, the device further comprising a heat exchanger for exchanging heat between the recycled exhaust gas and the heat-transfer liquid connected in parallel with the first heat exchanger for exchanging heat between the admission air and the heat-transfer liquid;

the heat exchanger for exchanging heat between the recycled exhaust gas and the heat-transfer liquid is also arranged in the module;

the first heat exchanger for exchanging heat between the admission air and the heat-transfer liquid is connected to a circuit for a liquid that is said to be "hot", hotter than the liquid of the cold heat-transfer liquid circuit, the connection being via selector means for selecting hot or cold liquid for the first heat exchanger for exchanging heat between the admission air and the heat-transfer liquid;

the hot heat-transfer liquid circuit is connected to a circuit for cooling the internal combustion engine;

the hot heat-transfer liquid circuit is thermally coupled to a hot source of a heat pump;

the selector means comprise a selector valve having at least three ports, comprising a first port for heat-transfer liquid inlet connected to the cold heat-transfer liquid circuit, a second port for heat-transfer liquid inlet connected to the hot heat-transfer liquid circuit, and a third port for heat-transfer liquid outlet connected to a heat-transfer liquid inlet of the first heat exchanger for exchanging heat between the admission air and the heat-transfer liquid;

the third port of the selector valve is connected both to the heat-transfer liquid inlet of the heat exchanger for exchanging heat between the admission air and the heat-transfer liquid and to a liquid inlet of the heat exchanger for exchanging heat between the recycled exhaust gas and the heat-transfer liquid via a duct common to the cold and the hot heat-transfer liquid circuits;

the selector means include a valve for controlling the flow rate of heat-transfer liquid through the heat exchanger for exchanging heat between the recycled exhaust gas and the heat-transfer liquid, the valve connecting the common duct to the inlet of said heat exchanger for exchanging heat between the recycled exhaust gas and heat-transfer liquid heat exchanger;

the admission air is entrained at a pressure higher than atmospheric pressure through the first heat exchanger for exchanging heat between the admission air and the heat-transfer liquid and the second heat exchanger for exchanging heat between the admission air and the heat-transfer fluid by a turbocompressor unit having a turbine driven by the exhaust gas from the internal combustion engine;

the internal combustion engine, e.g. of the diesel type, is connected to an exhaust system provided with a particle filter;

the heat-transfer liquid is a mixture of water and antifreeze;

the second heat exchanger for exchanging heat between the admission air and the heat-transfer fluid is disposed, in the admission air flow direction, downstream from the first heat exchanger for exchanging heat between the admission air and the heat-transfer liquid.

BRIEF DESCRIPTION OF THE DRAWINGS

The invention will be better understood on reading the following description given purely by way of example and made with reference to the accompanying drawings, in which.

DETAILED DESCRIPTION OF THE INVENTION

Figure 1:
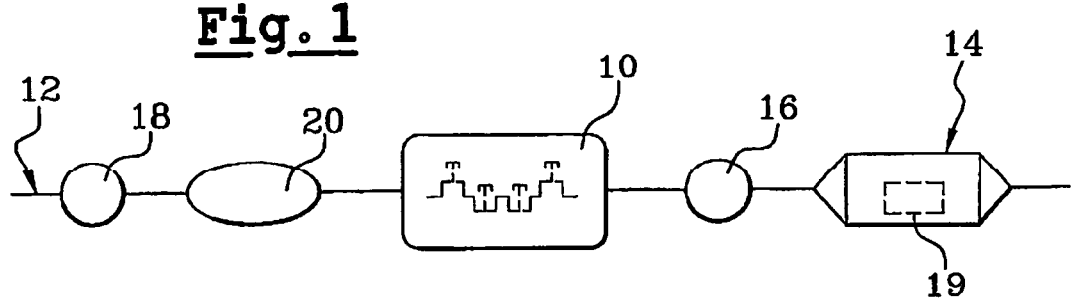
FIG. 1 is a diagrammatic view of an internal combustion engine connected to upstream means forming an air admission circuit and to downstream means forming an exhaust system.

FIG. 1 shows an internal combustion engine 10 of a motor vehicle, e.g. a diesel type engine, connected to upstream means forming a circuit 12 for admitting air into the engine 10 and to downstream means forming an exhaust system 14.

The engine 10 is supercharged by means of a turbocompressor unit provided firstly with a turbine 16 driven by the exhaust gas from the engine 10 and disposed downstream from the engine 10 in the exhaust system 14, and secondly with an admission air compressor 18 arranged upstream from the engine 10 in the air admission circuit 12. The turbine 16 and the compressor 18 are coupled together in rotation in conventional manner.

The exhaust system is provided with a conventional particle filter 19.

Figure 2:
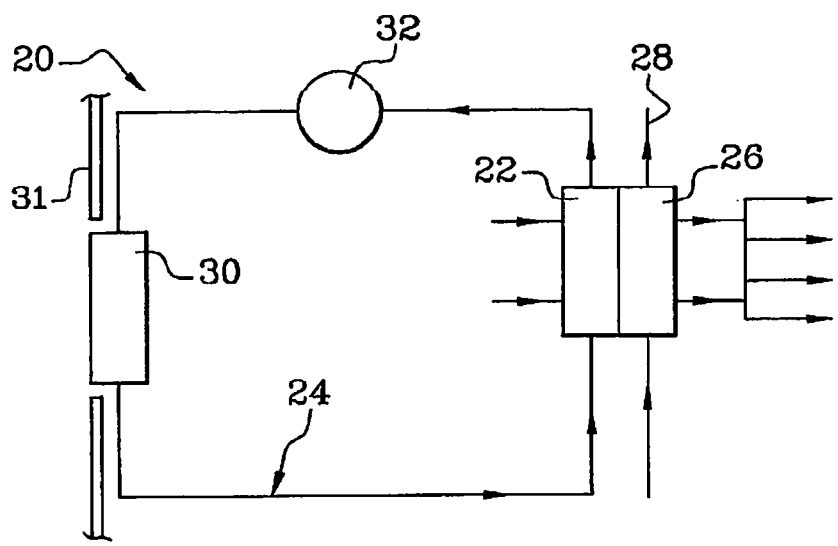
FIGS. 2 and 3 are diagrammatic views of devices for regulating the temperature of air admitted to the engine in two respective embodiments of the invention.
Figure 3:
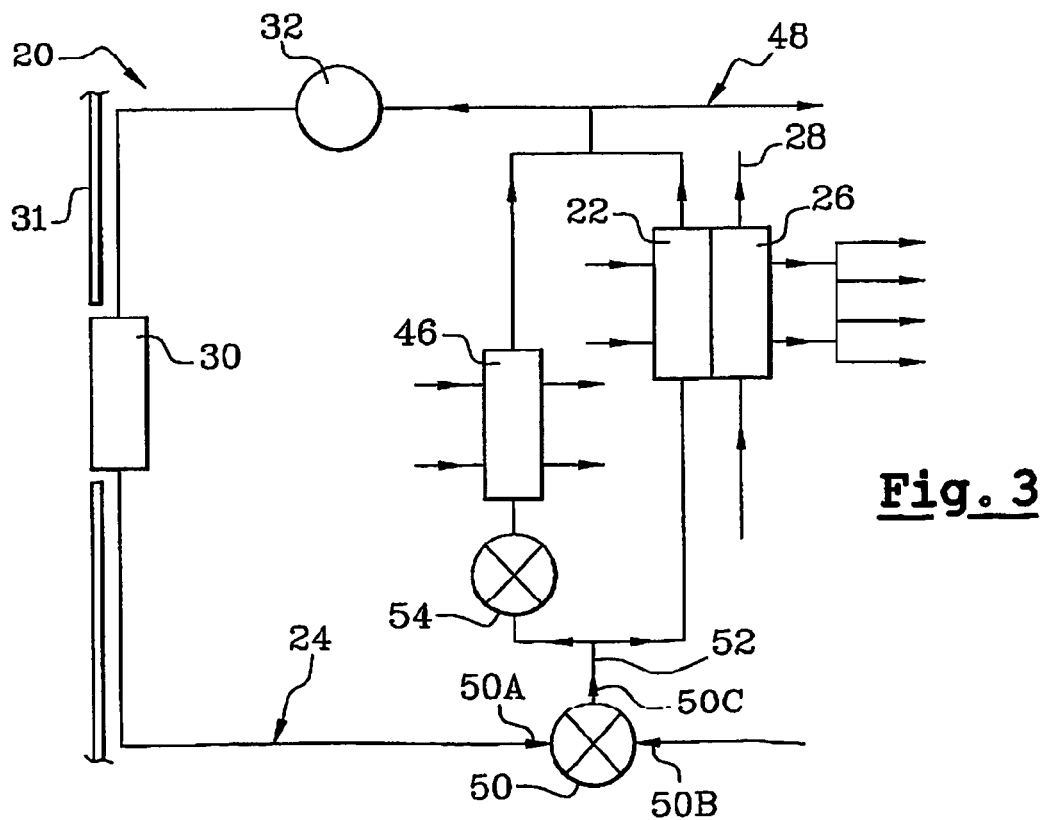

The temperature of the admission air leaving the compressor 18 is regulated by means of a temperature regulator device 20 of the invention, two embodiments of which are shown in FIGS. 2 and 3. In these figures, it should be observed that analogous elements are designated by identical references.

In the description below, two members are said to be thermally coupled to each other when they exchange heat between each other by means of a suitable heat exchanger.

FIG. 2 shows a device 20 for regulating the temperature of admission air in a first embodiment of the invention.

The device 20 comprises a conventional first heat exchanger 22 for exchanging heat between the admission air and a heat-transfer liquid for the purpose of regulating the temperature of the admission air as delivered by the compressor 18. This first heat exchanger 22 is connected to a circuit 24 for cold heat-transfer liquid in order to cool the admission air.

The device 20 also comprises a second conventional heat exchanger 26 for exchanging heat between the admission air and a heat-transfer liquid and also serving to regulate the temperature of the admission air. This second heat exchanger 26 is connected to a circuit 28 for very cold heat-transfer liquid that is colder than the liquid of the cold heat-transfer liquid circuit 24.

The admission air is driven through the first and second heat exchangers 22 and 26 for exchanging heat between the admission air and the heat-transfer liquids at a pressure greater than atmospheric pressure by the compressor 18. The flow of cooling air passing through these heat exchangers 22 and 26 is represented in FIG. 2 by arrows going from left to right.

It should be observed that the second heat exchanger 26 for exchanging heat between the admission air and the heat-transfer liquid is arranged downstream from the conventional first heat exchanger 22 for exchanging heat between the admission air and the heat-transfer liquid, in the admission air flow direction.

In a variant, the second heat exchanger 26 for exchanging heat between the admission air and the cooling fluid could be disposed, in the admission air flow direction, upstream from the conventional first heat exchanger 22 for exchanging heat between the admission air and the heat-transfer liquid.

The cold heat-transfer liquid circuit 24 comprises a conventional heat exchanger 30 for exchanging heat between air outside the vehicle and the cold heat-transfer liquid, referred to as a low temperature heat exchanger, preferably carried on the front face 31 of the motor vehicle. The cold heat-transfer liquid is put into circulation around the first circuit 24 by a conventional electrical pump 32.

Figure 4:
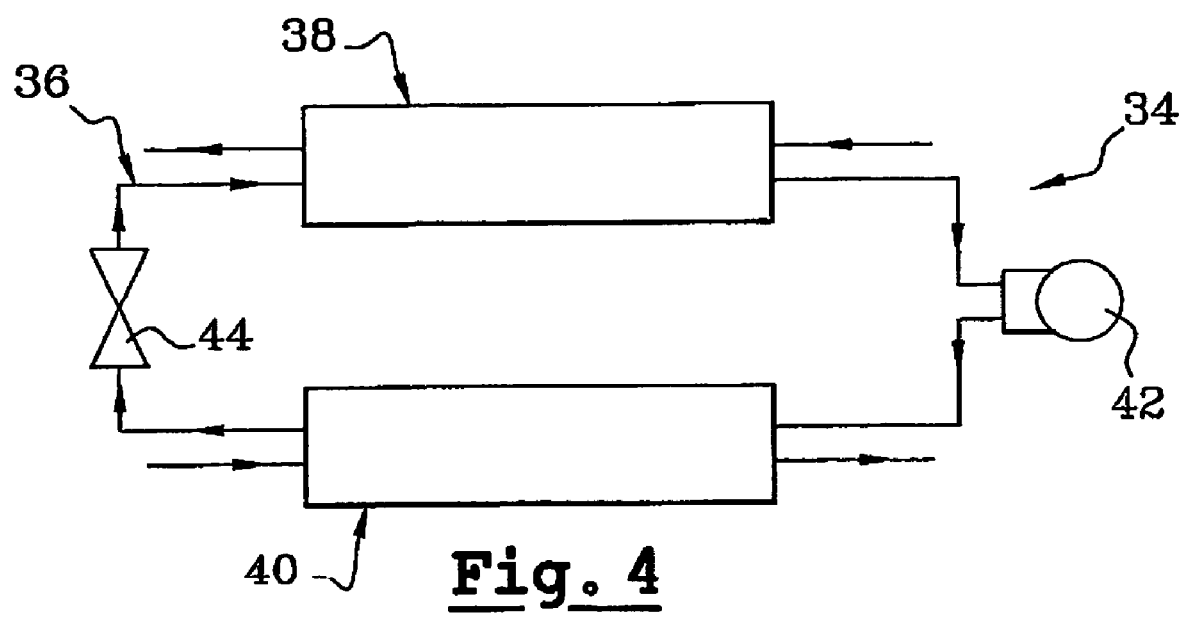
FIG. 4 is a diagrammatic view of a heat pump suitable for being thermally coupled to at least one of the circuits of the temperature regulator device of the invention.

FIG. 4 shows a heat pump 34, e.g. for air conditioning the vehicle cabin, comprising a refrigerant fluid circuit 36 of the compression type for taking heat from a cold source 38 to transfer at least some of it to a hot source 40. The refrigerant fluid is of conventional type such as a chlorine and fluorine derivative of methane or ethane (Freon), ammonia, carbon dioxide, etc.

The cold and hot sources 38 and 40 are interconnected by a compressor 42 and an expander valve 44. The refrigerant fluid vaporizes, taking heat from the cold source 38. The compressor 42 sucks in the vaporized fluid and delivers it towards the hot source where it condenses while cooling down. The expander valve 44 allows the liquid refrigerant fluid to pass to the cold source 38 by lowering its pressure. The flow direction of the refrigerant fluid in the circuit 36 is marked by arrows in FIG. 4.

By way of example, the very cold heat-transfer liquid circuit 28 is coupled thermally, either directly or indirectly, to the cold source 38 of the heat pump 34.

The heat-transfer liquid flowing in each of the cold and very cold heat-transfer liquid circuits 24 and 28 is of conventional type, comprising a mixture of water and antifreeze, for example.

Preferably, the first and second air/liquid heat exchangers 22 and 26 are arranged in a common module.

There follows a description of certain essential aspects of the operation of the temperature regulator device 20 constituting the first embodiment of the invention as shown in FIG. 2.

As can be seen from the description of this operation, the first and second heat exchanger 22 and 26 for exchanging heat between the admission air and the heat-transfer liquids form staged means for cooling the admission air.

The second heat exchanger 26 for exchanging heat between the admission air and the heat-transfer liquid and connected to the very cold heat-transfer liquid circuit 28 enables operation of the supercharged engine 10 to be optimized, more particularly when the engine 10 is delivering high torque, e.g. when the vehicle is climbing a hill or when the engine 10 is accelerating.

Assuming that ambient air surrounding the vehicle is initially at a temperature of 25° C., this air as sucked in by the compressor reaches a temperature of about 150° C. at the outlet from the compressor 18.

The admission air at the temperature of 150° C. is initially cooled by the first heat exchanger 22 for exchanging heat between the admission air and the heat-transfer liquid and connected to the low temperature heat exchanger 30 by the cold heat-transfer liquid circuit 24. On leaving the first heat exchanger 22, the temperature of the admission air is about 50° C. The air then passes through the second heat exchanger 26 for exchanging heat between the admission air and the heat-transfer liquid and connected to the very cold heat-transfer liquid circuit 28.

Assuming that the very cold heat-transfer liquid circuit 28 is thermally coupled to the cold source 38 of the heat pump, the temperature of the admission air at the outlet from the second heat exchanger 26 can be about 20° C.

In the above example, the air is admitted into the engine 10 at a temperature (20° C.) that is lower than the temperature of ambient air (25° C.), thereby enabling the performance of the engine to be improved. It is found that a saving of 10° C. on the temperature of admission air provides a gain of 3% in the performance of a diesel or gasoline type engine.

It should be observed that the power exchanged in the second heat exchanger 26 for exchanging heat between the admission air and the heat-transfer liquid is relatively low (about 2 kilowatts (kW)). This power can be obtained by means of a second heat exchanger 26 of relatively small dimensions in the flow direction of the admission air stream. This compact heat exchanger 26 thus has a limited effect on the head losses to which the air stream is subjected.

In general, the compressor 42 of the heat pump 34 (comprising a cold source 38 thermally coupled with the very cold heat-transfer liquid circuit 28) is itself coupled to the shaft of the engine 10.

Running the heat pump 34 thus reduces the mechanical performance of the engine. Nevertheless, the overall energy budget remains positive. A saving of 30° C. on the admission air corresponds to a net gain of 7% in the mechanical performance at the shaft of the engine 10.

The first heat exchanger 22 for exchanging heat between the admission air and the heat-transfer liquid is used at its maximum power for lowering the temperature of the admission air down to 50° C. in the above example. The second heat exchanger 26 for exchanging heat between the admission air and the heat-transfer liquid, in series with the first heat exchanger 22, serves to further reduce the temperature of the admission air so as to optimize operation of the engine.

FIG. 3 shows a device 20 for regulating the temperature of admission air in a second embodiment of the invention.

In certain types of engine, a fraction of the exhaust gas is recirculated with the admission air using suitable conventional means. This is commonly referred to as exhaust gas recycling (EGR). When mixed with the admission air by the appropriate conventional means, the recycled exhaust gas is delivered to the engine 10.

The admission air temperature regulator device 20 of the second embodiment shown in FIG. 3 enables the temperature of the recycled exhaust gas to be regulated, specifically for reducing the temperature of the exhaust gas prior to mixing with the admission air and delivery to the engine 10.

To this end, a heat exchanger 46 for exchanging heat between the recycled exhaust gas and a heat-transfer liquid is connected in parallel with the first heat exchanger 22 for exchanging heat between the admission air and the heat-transfer liquid. The recirculated stream of exhaust gas passing through the heat exchanger 46 is represented in FIG. 3 by arrows going from left to right.

The heat exchanger 46 for exchanging heat between the recycled exhaust gas and the heat-transfer liquid is preferably also disposed in the module that unites the first and second heat exchangers 22 and 26 for exchanging heat between the admission air and the heat-transfer liquids.

Furthermore, the admission air temperature regulator device 20 in the second embodiment of the invention can serve both to cool the admission air to heat it.

It is desirable to heat the admission air for an engine, particularly when the engine is connected to an exhaust system having a particle filter. The filter must be regenerated periodically so as to eliminate particles of soot that accumulate therein. Regeneration is performed by heating the admission air to a temperature that is high enough to cause the particles of soot to burn.

The first heat exchanger 22 for exchanging heat between the admission air and the heat-transfer liquid is connected to a "hot" liquid circuit 48 for heating the admission air via means for selecting a hot or a cold liquid for the heat exchanger 22.

The liquid circulating in the hot heat-transfer liquid circuit 48 is of conventional type and comprises, for example, a mixture of water and antifreeze.

The selector means comprise a conventional three-port selector valve 50 e.g. of the on/off type or of the proportional type, and comprising:

a first inlet port for heat-transfer liquid 50A connected to the cold heat-transfer liquid circuit 24;

a second inlet port for heat-transfer liquid 50B connected to the hot heat-transfer liquid circuit 48; and a third port constituting a liquid outlet port 50C connected both to the liquid inlet of the first heat exchanger 22 for exchanging heat between the admission air and the heat transfer liquid and to a liquid inlet of the heat exchanger 46 for exchanging heat between the recycled exhaust gas and the heat-transfer liquid via a duct 52 common to the hot and cold liquid circuits 24 and 48.

The hot heat-transfer liquid circuit 48 is connected, for example, to a conventional cooling circuit for the engine 10 (not shown in the figures). In a variant, the hot heat-transfer liquid circuit 48 may be thermally coupled, directly or indirectly, with the hot source 40 of the heat pump 34.

A valve 54 for adjusting the flow rate of the liquid flowing through the heat exchanger 46 for exchanging heat between the recycled exhaust gas and the heat-transfer liquid connects the common duct 52 to the inlet of the heat exchanger 46. The adjustment valve 54 is of conventional type, e.g. of the on/off type or of the proportional type.

There follows a description of certain essential aspects of the operation of the temperature regulator device 20 of the second embodiment of the invention as shown in FIG. 3.

For the purpose of cooling both the recycled exhaust gas and the admission air at the outlet from the compressor 18, the adjustment valve 54 is open and the selector valve 50 is disposed so as to connect the first heat exchanger 22 for exchanging heat between the admission air and the heat-transfer liquid to the cold heat-transfer liquid circuit 24. The flow rate of cold heat-transfer liquid passing through the low temperature heat exchanger 30 is regulated by the pump 32.

The distribution of heat-transfer liquid flows through the respective heat exchangers 22 and 46 can be adjusted by adjusting the valve 54.

The heat-transfer liquid circulating in the first heat exchanger 22 cools the admission air by taking heat therefrom. This admission air is also cooled by the second heat exchanger 26 for exchanging heat between the admission air and the heat-transfer liquid in the same manner as in the operation described above.

In order to heat the admission air, e.g. for the purpose of regenerating the particle filter 19, the adjustment valve 54 is closed and the selector valve 50 is set to connect the first heat exchanger 22 for exchanging heat between the admission air and the heat-transfer liquid to the hot heat-transfer liquid circuit 48. The liquid flowing through the heat exchanger 22 heats the admission air by delivering heat thereto. Naturally, the second heat exchanger 26 for exchanging heat between the admission air and the heat-transfer liquid is deactivated.

The invention includes the advantage whereby the second heat exchanger 26 for exchanging heat between the admission air and the heat-transfer liquid enables the cooling of admission air to the engine to be optimized, in particular at the outlet from a compressor of a turbocompressor unit.

In addition, the first and second heat exchangers 22 and 26 for exchanging heat between the admission air and the heat-transfer liquids can be arranged in a common module in an installation for regulating the temperature of admission air, and the heat exchanger 46 for exchanging heat between the recycled exhaust gas and the heat-transfer liquid can also be arranged in the same module.

The invention is not limited to the embodiments described above.

In particular, the heat-transfer liquid flowing through the second heat exchanger 26 for exchanging heat between the admission air and the heat-transfer liquid and the very cold heat-transfer liquid circuit 28 can be replaced, where appropriate, by a heat-transfer fluid such as carbon dioxide $CO_2$ or Freon circulated by a heat pump such as the heat pump 34.

The invention claimed is:

1. A device for regulating the temperature of intake air for a motor vehicle internal combustion engine, the device comprising a first heat exchanger for exchanging heat between the intake air and a first heat-transfer fluid of a first circuit, and a second heat exchanger for exchanging heat between the intake air and a second heat-transfer fluid of a second circuit, where the second heat-transfer fluid is colder than the first heat-transfer fluid and a third heat exchanger is connected in parallel with the first heat exchanger and the third heat exchanger exchanges heat between at least some exhaust gas from the internal combustion engine and the first heat-transfer fluid.

2. The device of claim 1, wherein the first circuit comprises a heat exchanger located on a front face of the motor vehicle so that the first heat-transfer fluid exchanges heat with air.

3. The device of claim 1, wherein a first pump circulates the first heat-transfer fluid in the first circuit.

4. The device of claim 1, wherein the first and second heat-transfer fluids comprise a liquid.

5. The device of claim 1, wherein the heat-transfer fluids circulating both in the second heat exchanger for exchanging heat between the intake air and the heat-transfer fluid and in the colder heat-transfer fluid are selected from the group consisting of carbon-dioxide and freon.

6. The device of claim 1, wherein, wherein the second heat-transfer fluid is thermally coupled to a cold source of a heat pump.

7. The device of claim 1, wherein a module comprises both the first and second heat exchangers.

8. The device of claim 1, wherein a module includes the first, second and third heat exchangers.

9. The device of claim 1, wherein a connection connects the first heat exchanger to a third circuit for a third heat-exchange fluid that is hotter than the first heat-exchange fluid, the connection includes a selector for selecting the first or third heat-exchange fluids for use in the first heat exchanger.

10. The device of claim 9, wherein the third circuit is connected to a cooling circuit of the internal combustion engine.

11. The device of claim 9, wherein the third circuit is thermally coupled to a hot source of a heat pump.

12. The device of claim 9, wherein the selector includes a selector valve comprising a first port, a second port and a third port, the first port comprising an inlet for heat-transfer fluid connected to the first heat-transfer circuit, the second port comprising an inlet for heat-transfer fluid connected to the third heat-transfer circuit, and the third port comprising an outlet for heat-transfer fluid connected to the first heat exchanger.

13. The device of claim 12, wherein a duct connects the third port of the selector valve both to the heat-transfer fluid inlet of the first heat exchanger and to the heat-transfer fluid inlet of the third heat exchanger.

14. The device of claim 13, wherein the selector include a valve for controlling flow rate of heat-transfer fluid through the third heat exchanger, the valve connecting the duct to the heat-transfer fluid inlet of the third heat exchanger.

15. The device of claim 1, wherein a turbo-compressor comprising a turbine driven by exhaust gas from the internal combustion engine maintains intake air at a pressure higher than atmospheric pressure in both the first and second heat exchangers.

16. The device of claim 1, wherein the internal combustion engine includes an exhaust system provided with a particle filter.

17. The device of claim 1, wherein the heat-transfer fluid comprises a mixture of water and antifreeze.

18. The device of claim 1, wherein intake air has a flow direction towards an air intake, and the second heat exchanger is downstream of the first heat exchanger relative to the flow direction.

* * * * *